US012326366B2

(12) United States Patent
Shi et al.

(10) Patent No.: US 12,326,366 B2
(45) Date of Patent: Jun. 10, 2025

(54) LINEAR ARRAY SCANNING BRILLOUIN SCATTERING ELASTIC IMAGING DEVICE

(71) Applicant: Nanchang Hangkong University, Jiangxi (CN)

(72) Inventors: Jiulin Shi, Nanchang (CN); Jin Xu, Nanchang (CN); Tianchi Sun, Nanchang (CN); Liangya Cui, Nanchang (CN); Xin Lan, Nanchang (CN); Mingxuan Liu, Nanchang (CN); Xingdao He, Nanchang (CN)

(73) Assignee: Nanchang Hangkong University, Nanchang (CN)

( * ) Notice: Subject to any disclaimer, the term of this patent is extended or adjusted under 35 U.S.C. 154(b) by 128 days.

(21) Appl. No.: 18/214,974

(22) Filed: Jun. 27, 2023

(65) Prior Publication Data

US 2024/0044709 A1 Feb. 8, 2024

(30) Foreign Application Priority Data

Aug. 2, 2022 (CN) .......................... 202210923388.7

(51) Int. Cl.
*G01J 3/44* (2006.01)
*G01J 3/02* (2006.01)
(Continued)

(52) U.S. Cl.
CPC ........... *G01J 3/4412* (2013.01); *G01J 3/0208* (2013.01); *G01J 3/0224* (2013.01); *G01J 3/0229* (2013.01);
(Continued)

(58) Field of Classification Search
CPC ...... G01J 3/4412; G01J 3/0208; G01J 3/0224; G01J 3/0229; G01J 3/027; G01J 3/0278;
(Continued)

(56) References Cited

U.S. PATENT DOCUMENTS 9,964,396 B1 * 5/2018 Scott .................. G01B 9/02051
10,386,288 B2 * 8/2019 Scarcelli ............ G01N 15/1434
(Continued)

FOREIGN PATENT DOCUMENTS

CN 104568846 A * 4/2015 ............. G01N 21/53
CN 107290050 A * 10/2017 ................ G01J 3/06
(Continued)

OTHER PUBLICATIONS

Aleman, Ademir, et al. "Frequency comb enhanced Brillouin microscopy." Optics Express 28.20 (2020): 29540-29552. (Year: 2020).*

*Primary Examiner* — Michelle M Iacoletti
*Assistant Examiner* — Noah J. Haney
(74) *Attorney, Agent, or Firm* — Holzer Patel Drennan

(57) ABSTRACT

Disclosed is a linear array scanning Brillouin scattering elastic imaging device. In the device, a signal generating system consists of a narrow linewidth continuous wave laser, a half-wave plate, a beam expander, a Y-direction scanning galvanometer, a microlens array, a pinhole array filter, a first plano-convex lens, a polarization beam splitter, a quarter-wave plate and a microscope objective. A signal receiving system consists of a microscope objective, a quarter-wave plate, a polarization beam splitter and an eight-channel optical collimator array. Each channel of an eight-channel spectrometer consists of an optical collimator, a convex lens, a scanning Fabry-Perot interferometer, a photomultiplier tube and an eight-channel photon collection card.

6 Claims, 1 Drawing Sheet

(51) Int. Cl.
G01J 3/06 (2006.01)
G01J 3/26 (2006.01)
G01J 3/28 (2006.01)
G01J 3/443 (2006.01)
G01J 3/453 (2006.01)
G01J 9/02 (2006.01)
G01N 21/01 (2006.01)
G01N 21/47 (2006.01)

(52) U.S. Cl.
CPC ............ G01J 3/027 (2013.01); G01J 3/0278 (2013.01); G01J 3/0294 (2013.01); G01J 3/06 (2013.01); G01J 3/26 (2013.01); G01J 3/28 (2013.01); G01J 3/4537 (2013.01); G01N 21/01 (2013.01); G01N 21/47 (2013.01); *G01J 3/443* (2013.01); *G01J 2009/0257* (2013.01)

(58) Field of Classification Search
CPC .... G01J 3/0294; G01J 3/06; G01J 3/26; G01J 3/28; G01J 3/4537; G01J 3/443; G01J 2009/0257; G01N 21/01; G01N 21/47

USPC ......................................... 356/326, 454, 519
See application file for complete search history.

(56) References Cited

U.S. PATENT DOCUMENTS

2009/0323056 A1* 12/2009 Yun .......................... G01J 3/26
356/326
2019/0335994 A1* 11/2019 Yun ....................... G01J 3/0229
2024/0369815 A1* 11/2024 Zhang ................. G02B 21/002

FOREIGN PATENT DOCUMENTS

| CN | 107764741 | A | * | 3/2018 | ............. G01N 21/01 |
| CN | 110772217 | A | * | 2/2020 | ................. G01J 3/45 |
| CN | 110967817 | A | * | 4/2020 | ......... G01N 21/6458 |
| CN | 113189054 | A | * | 7/2021 | ............. G01N 21/49 |
| EP | 3118608 | A1 | * | 1/2017 | ............ G01J 3/0208 |

* cited by examiner

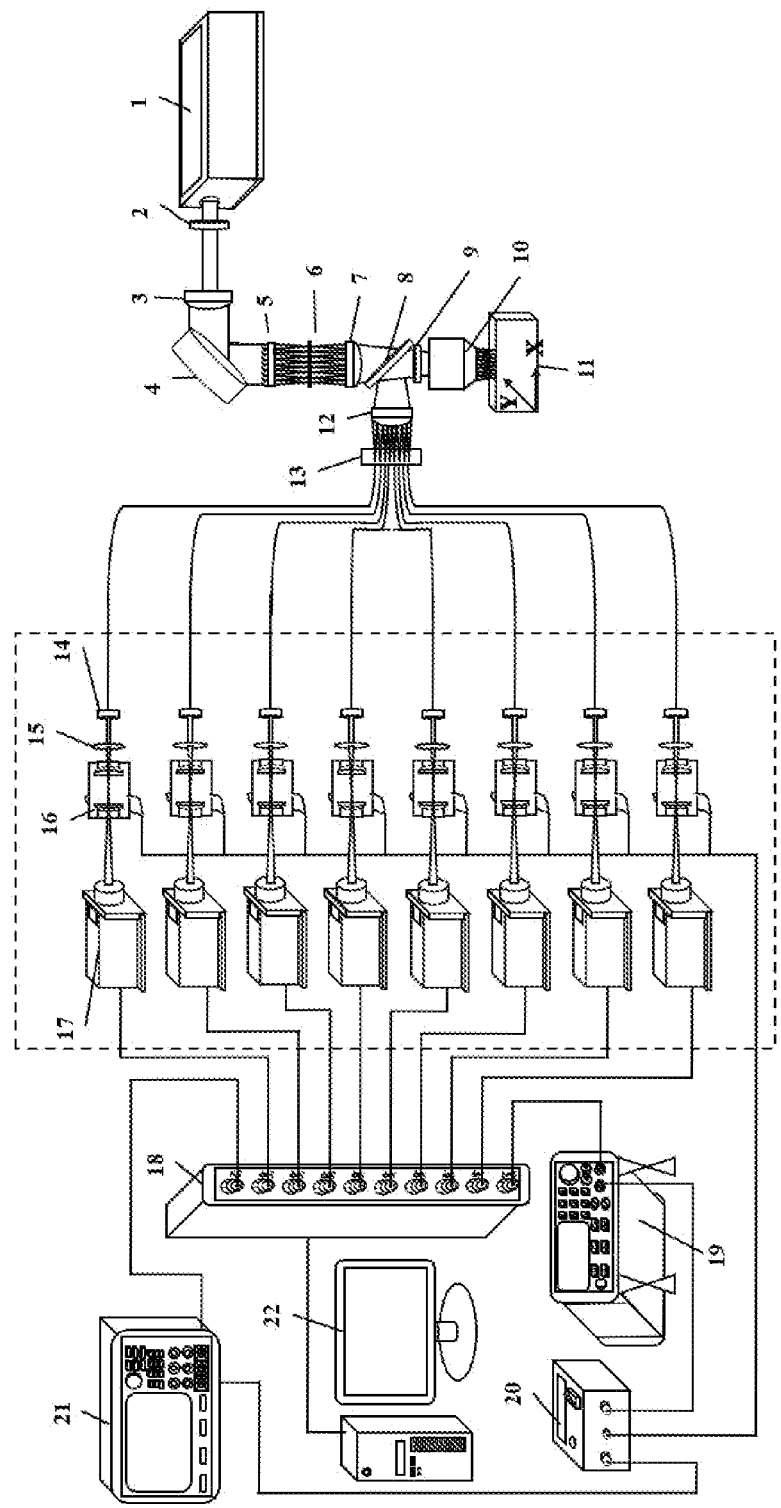

LINEAR ARRAY SCANNING BRILLOUIN SCATTERING ELASTIC IMAGING DEVICE

CROSS-REFERENCE TO RELATED APPLICATION

This patent application claims the benefit and priority of Chinese Patent Application No. 202210923388.7, filed with the China National Intellectual Property Administration on Aug. 2, 2022, the disclosure of which is incorporated by reference herein in its entirety as part of the present application.

TECHNICAL FIELD

The present disclosure relates to the field of imaging technology, in particular to linear array scanning Brillouin scattering elastic imaging device.

BACKGROUND

As a measuring system device, the device is mainly used for rapid and high-resolution detection of the elastic modulus of various parts of biological tissues by combining the three devices such as a microlens array, a scanning galvanometer and an eight-channel spectrometer. The idea lies in that Brillouin scattering is an inelastic scattering process, and the spectral characteristics are closely related to the properties (such as density, viscosity and elastic modulus) of the medium, so the Brillouin scattering elastic imaging technology can be used for measuring the elastic modulus of biological tissues. At present, the Brillouin scattering elastic imaging system mainly images the elasticity of a certain area of the sample in two ways. In one way, the sample is placed on a three-dimensional displacement table for three-dimensional elasticity detection. In the other way, a scanning galvanometer is added to the system to scan the X-Y surface, and the sample height is adjusted for Z-axis detection. However, in the both ways, the time required for detecting the sample is prolonged. When the Brillouin scattering elastic imaging system is used for detecting the elasticity of biological tissues in vitro, too long detection time may lead to tissue degeneration, and then the detection result is different from the real elasticity of biological tissues. At the same time, during in vivo elasticity detection, the detection time is too long, possibly leading to certain tissue damages.

SUMMARY

The present disclosure aims to solve the technical problems in the prior art, and provides a linear array scanning Brillouin scattering elastic imaging device.

In order to achieve the purpose, the technical scheme provided by the present disclosure is as follows. The linear array scanning Brillouin scattering elastic imaging device includes a signal generating system, a signal receiving system and an eight-channel spectrometer.

The signal generating system consists of a narrow linewidth continuous wave laser, a half-wave plate, a beam expander, a Y-direction scanning galvanometer, a microlens array, a pinhole array filter, a first plano-convex lens, a polarization beam splitter, a quarter-wave plate and a microscope objective. In the signal generating system, a laser beam emitted by the continuous wave laser passes through the half-wave plate, and then is expanded by the beam expander and reflected to the microlens array by the Y-direction scanning galvanometer. After passing through the pinhole array filter and being focused by the first plano-convex lens, the laser beam passes through the polarization beam splitter and the quarter-wave plate, and is incident on the microscope objective to form eight focused beams on a sample.

The signal receiving system consists of a microscope objective, a quarter-wave plate, a polarization beam splitter and an eight-channel optical collimator array. In the signal receiving system, a plurality of backward Brillouin scattering signal beams excited by the eight focused beams at the sample pass through the microscope objective and the quarter-wave plate and are reflected by the polarization beam splitter, and the reflected signal beams are focused to the eight-channel optical collimator array by a second plano-convex lens.

Each channel of the eight-channel spectrometer consists of an optical collimator, a convex lens, a scanning Fabry-Perot interferometer, a photomultiplier tube and an eight-channel photon collection card. A plurality of backward Brillouin scattering signal beams received by the signal receiving system enter the eight-channel spectrometer, and each beam enters different spectrometer channels according to different longitudinal positions. In each spectrometer channel, the collimated signal beams output by the optical collimator are focused into the scanning Fabry-Perot interferometer through the convex lens, and the signal beams after frequency discrimination are detected by the photomultiplier tube. The detected scattered signals are collected by the eight-channel photon collection card and stored in a computer for processing, and a collected Brillouin spectrum is displayed.

Preferably, the device further includes a function generator, a piezoelectric ceramic controller and an oscilloscope. The function generator is used for generating sawtooth wave or triangular wave voltage required for repeatedly scanning the cavity length of the Fabry-Perot interferometer so as to sweep one free spectral range of the scanning Fabry-Perot interferometer, and the function generator also provides the synchronous trigger signals of the eight-channel photon collection card and the scanning Fabry-Perot interferometer. The piezoelectric ceramic controller is used for providing control voltage for scanning piezoelectric ceramics in the Fabry-Perot interferometer. The oscilloscope is used for displaying the control signal of the function generator and trigger signal waveforms received by the eight-channel photon collection card.

Preferably, eight focused beams in the generating system are obtained by focusing a wide-field single beam expanded by the beam expander by the microlens array, and a beam array along the X axis is generated at the sample, and then the beam array interacts with the sample at eight positions on the X axis of the sample at the same time to generate Brillouin scattering signals.

Preferably, the microlens array is combined with the Y-direction scanning galvanometer, the Y-direction scanning galvanometer scans in the Y-axis direction and is matched with the beam array generated by the microlens array on the X-axis of the sample, the deflection angle of the Y-direction scanning galvanometer is adjusted so that the X-axis beam array move along the Y-axis, and then the function of detecting the elasticity on the X-Y surface of the sample is realized.

Preferably, the microlens array is combined with the Y-direction scanning galvanometer to detect the elasticity on the X-Y surface of the sample. After the X-Y surface at the same height is detected, the height of the sample is adjusted, and the X-Y surface is redetected. Through the chromatographic detection method, the three-dimensional elasticity of the sample is detected.

Preferably, the eight-channel optical collimator array consists of eight optical collimators connected in parallel, and is used for receiving Brillouin scattering signals generated at eight positions in the X-axis direction of the sample, and the eight scattered signal beams are respectively transmitted to the eight-channel spectrometer.

The present disclosure has the following beneficial effects.

According to the device, the Y-direction scanning galvanometer is combined with a microarray lens to realize the rapid linear array scanning of the sample on the X-Y surface, and at the same time, the scanning Fabry-Perot interferometer with high spectral resolution is adopted to distinguish Brillouin scattering signals at eight different positions generated by the microarray lens. By controlling the scanning time of the Y-direction scanning galvanometer and the collection time of the eight-channel photon collection card, the elastic modulus of the X-Y surface of the sample can be detected quickly at high resolution. The elastic detection time of the Brillouin scattering elastic imaging system is prolonged, the difference caused by tissue degeneration is reduced, and the possible damage to living biological tissues is avoided, so that the device is of great significance for the application of the Brillouin scattering elastic imaging system in clinical elastic detection.

BRIEF DESCRIPTION OF THE DRAWINGS

Attached figures, which form a part of the description and are provided for further understanding of the present disclosure, show the preferred embodiments of the present disclosure, and explain the principle of the present disclosure together with the description, but not by way of limitation with regard to the claimed disclosure.

FIG. 1 is a structural schematic diagram of a linear array scanning Brillouin scattering elastic imaging device.

REFERENCE SIGNS IN THE ATTACHED FIGURES 1, narrow linewidth continuous wave laser; 2, half-wave plate; 3, beam expander; 4, Y-direction scanning galvanometer; 5, microlens array; 6, pinhole array filter; 7, first plano-convex lens; 8, polarization beam splitter; 9, quarter-wave plate; 10, microscope objective; 11, sample; 12, second plano-convex lens; 13, eight-channel optical collimator array; 14, optical collimator; 15, convex lens; 16, scanning Fabry-Perot interferometer; 17, photomultiplier tube; 18, eight-channel photon collection card; 19, function generator; 20, piezoelectric ceramic controller; 21, oscilloscope; and 22, computer.

DETAILED DESCRIPTION OF THE EMBODIMENTS

Specific embodiments of the present disclosure will be described in detail in the part, preferred embodiments of the present disclosure are illustrated in the attached figures, and the accompanying drawings serve to supplement the description of the text of the specification with graphics, so that each technical feature and the overall technical scheme of the present disclosure can be intuitively and vividly understood and cannot be understood as limitation of the scope of protection of the present disclosure.

In the description of the present disclosure, "several" means one or more, "multiple" means two or more, "greater than", "less than", "exceed" and the like are understood to exclude the present number, and "above", "below", "within" and the like are understood to include the present number. If "first" and "second" are described for purposes of distinguishing technical features only, "first" and "second" are not understood for indicating or implying relative importance or implicitly indicating the number of indicated technical features or implicitly indicating the precedence relationship of indicated technical features.

Referring to FIG. 1, according to the preferable embodiment of the present disclosure, a linear array scanning Brillouin scattering elastic imaging device includes a signal generating system, a signal receiving system and an eight-channel spectrometer.

The signal generating system consists of a narrow linewidth continuous wave laser 1, a half-wave plate 2, a beam expander 3, a Y-direction scanning galvanometer 4, a microlens array 5, a pinhole array filter 6, a first plano-convex lens 7, a polarization beam splitter 8, a quarter-wave plate 9 and a microscope objective 10. In the signal generating system, a laser beam emitted by the continuous wave laser 1 passes through the half-wave plate 2, and then is expanded by the beam expander 3 and reflected to the microlens array 5 by the Y-direction scanning galvanometer 4. After passing through the pinhole array filter 6 and being focused by the first plano-convex lens 7, the laser beam passes through the polarization beam splitter 8 and the quarter-wave plate 9, and is incident on the microscope objective 10 to form eight focused beams on a sample 11.

The signal receiving system consists of a microscope objective 10, a quarter-wave plate 9, a polarization beam splitter 8 and an eight-channel optical collimator array 13. In the signal receiving system, a plurality of backward Brillouin scattering signal beams excited by the eight focused beams at the sample 11 pass through the microscope objective 10 and the quarter-wave plate 9 and are reflected by the polarization beam splitter 8, and the reflected signal beams are focused to the eight-channel optical collimator array 13 by a second plano-convex lens 12.

Each channel of the eight-channel spectrometer consists of an optical collimator 14, a convex lens 15, a scanning Fabry-Perot interferometer 16, a photomultiplier tube 17 and an eight-channel photon collection card 18. A plurality of backward Brillouin scattering signal beams received by the signal receiving system enter the eight-channel spectrometer, and each beam enters different spectrometer channels according to different longitudinal positions. In each spectrometer channel, the collimated signal beams output by the optical collimator 14 are focused into the scanning Fabry-Perot interferometer 16 through the convex lens 15. Through the high fineness of the scanning Fabry-Perot interferometer 16, the spectrometer system is very high in spectral resolution, and then the tiny Brillouin frequency shift can be distinguished, so that the tiny elastic differences of the sample 11 at different positions are distinguished. The signal beams after frequency discrimination are detected by the photomultiplier tube 17, and the detected scattered signals are collected by the eight-channel photon collection card 18 and stored in a computer 22 for processing, and a collected Brillouin spectrum is displayed. The eight-channel photon collection card 18 receives and stores the Brillouin scattering signals collected by the photomultiplier tube 17 at eight positions in the X-axis direction, and the Brillouin spectrum is recorded and displayed at the same time.

Specifically, the microlens array 5 excites the Brillouin scattering signals at eight positions in the X-axis direction at the same time, and the Y-direction scanning galvanometer 4 enables the light beams to scan along the Y-axis direction. The Y-direction scanning galvanometer 4 is combined with the microlens array 5 to realize the rapid linear array scanning of the sample 11 on the X-Y surface. At the same time, the scanning Fabry-Perot interferometer 16 with high spectral resolution of the eight-channel spectrometer is adopted to distinguish the Brillouin scattering signals at eight different positions generated by the microarray lens 5 at the same time. By controlling the scanning time of the Y-direction scanning galvanometer 4 and the collection time of the eight-channel photon collection card 18, the elastic modulus of the X-Y surface of the sample 11 can be detected quickly at high resolution.

The elastic detection time of the Brillouin scattering elastic imaging system is prolonged, the difference caused by tissue degeneration is reduced, and the possible damage to living biological tissues is avoided, so that the device is of great significance for the application of the Brillouin scattering elastic imaging system in clinical elastic detection.

As the preferable embodiment of the present disclosure, the embodiment can also have the following additional technical features.

In the embodiment, the device further includes a function generator 19, a piezoelectric ceramic controller 20 and an oscilloscope 21. The function generator 19 is used for generating sawtooth wave or triangular wave voltage required for repeatedly scanning the cavity length of the Fabry-Perot interferometer 16 so as to sweep one free spectral range of the scanning Fabry-Perot interferometer 16, and the function generator 19 also provides the synchronous trigger signals of the eight-channel photon collection card 18 and the scanning Fabry-Perot interferometer 16. The piezoelectric ceramic controller 20 is used for providing control voltage for scanning piezoelectric ceramics in the Fabry-Perot interferometer 16. The oscilloscope 21 is used for displaying the control signal of the function generator 19 and trigger signal waveforms received by the eight-channel photon collection card 18.

In the embodiment, eight focused beams in the generating system are obtained by focusing a wide-field single beam expanded by the beam expander 3 by the microlens array 5, and a beam array along the X axis is generated at the sample 11, and then the beam array interacts with the sample at eight positions on the X axis of the sample 11 at the same time to generate Brillouin scattering signals.

In the embodiment, the microlens array 5 is combined with the Y-direction scanning galvanometer 4, the Y-direction scanning galvanometer 4 scans in the Y-axis direction and is matched with the beam array generated by the microlens array 5 on the X-axis of the sample 11, the deflection angle of the Y-direction scanning galvanometer 4 is adjusted so that the X-axis beam array move along the Y-axis, and then the function of detecting the elasticity on the X-Y surface of the sample 11 is realized.

In the embodiment, the microlens array 5 is combined with the Y-direction scanning galvanometer 4 to detect the elasticity on the X-Y surface of the sample. After the X-Y surface at the same height is detected, the height of the sample 11 is adjusted, and the X-Y surface is redetected. Through the chromatographic detection method, the three-dimensional elasticity of the sample 11 is detected.

In the embodiment, the eight-channel optical collimator array 13 consists of eight optical collimators 14 connected in parallel, and is used for receiving Brillouin scattering signals generated at eight positions in the X-axis direction of the sample 11, and the eight scattered signal beams are respectively transmitted to the eight-channel spectrometer.

On the premise of no conflict, those skilled in the art can freely combine and superimpose the above additional technical features.

The above mentioned is just the preferable embodiments of the present disclosure, the technical scheme for realizing the purpose of the present disclosure in basically same means belongs to the scope of protection in the present disclosure.

What is claimed is:

1. A linear array scanning Brillouin scattering elastic imaging device, comprising a signal generating system, a signal receiving system and an eight-channel spectrometer, wherein the signal generating system consists of a narrow linewidth continuous wave laser, a half-wave plate, a beam expander, a Y-direction scanning galvanometer, a microlens array, a pinhole array filter, a first plano-convex lens, a polarization beam splitter, a quarter-wave plate and a microscope objective; in the signal generating system, a laser beam emitted by the continuous wave laser passes through the half-wave plate, and then is expanded by the beam expander and reflected to the microlens array by the Y-direction scanning galvanometer; after passing through the pinhole array filter and being focused by the first plano-convex lens, the laser beam passes through the polarization beam splitter and the quarter-wave plate, and is incident on the microscope objective to form eight focused beams on a sample;

the signal receiving system consists of the microscope objective, the quarter-wave plate, the polarization beam splitter and an eight-channel optical collimator array; in the signal receiving system, a plurality of backward Brillouin scattering signal beams excited by the eight focused beams at the sample pass through the microscope objective and the quarter-wave plate and are reflected by the polarization beam splitter, and reflected signal beams are focused to the eight-channel optical collimator array by a second plano-convex lens;

each channel of the eight-channel spectrometer consists of an optical collimator, a convex lens, a scanning Fabry-Perot interferometer, a photomultiplier tube and an eight-channel photon collection card; a plurality of backward Brillouin scattering signal beams received by the signal receiving system enter the eight-channel spectrometer, and each beam enters different spectrometer channels according to different longitudinal positions; in each spectrometer channel, collimated signal beams output by the optical collimator are focused into the scanning Fabry-Perot interferometer through the convex lens, and the signal beams after frequency discrimination are detected by the photomultiplier tube; and the detected scattered signals are collected by the eight-channel photon collection card and stored in a computer for processing, and a collected Brillouin spectrum is displayed.

2. The linear array scanning Brillouin scattering elastic imaging device according to claim 1, further comprising a function generator, a piezoelectric ceramic controller and an oscilloscope, wherein the function generator is configured to generate sawtooth wave or triangular wave voltage required for repeatedly scanning the cavity length of the scanning Fabry-Perot interferometer so as to sweep one free spectral range of the scanning Fabry-Perot interferometer, and the function generator also provides synchronous trigger signals of the eight-channel photon collection card and the scanning Fabry-Perot interferometer; the piezoelectric ceramic controller is configured to provide control voltage for scanning piezoelectric ceramics in the scanning Fabry-Perot interferometer; and the oscilloscope is configured to display a control signal of the function generator and trigger signal waveforms received by the eight-channel photon collection card.

3. The linear array scanning Brillouin scattering elastic imaging device according to claim 1, wherein eight focused beams in the generating system are obtained by focusing a wide-field single beam expanded by the beam expander by the microlens array, and a beam array along the X axis is generated at the sample, and then the beam array interacts with the sample at eight positions on the X axis of the sample at the same time to generate Brillouin scattering signals.

4. The linear array scanning Brillouin scattering elastic imaging device according to claim 3, wherein the microlens array is combined with the Y-direction scanning galvanometer, the Y-direction scanning galvanometer scans in the Y-axis direction and is matched with the beam array generated by the microlens array on the X-axis of the sample, a deflection angle of the Y-direction scanning galvanometer is adjusted so that the X-axis beam array move along the Y-axis, and then a function of detecting the elasticity on an X-Y surface of the sample is realized.

5. The linear array scanning Brillouin scattering elastic imaging device according to claim 4, wherein the microlens array is combined with the Y-direction scanning galvanometer to detect the elasticity on the X-Y surface of the sample; after the X-Y surface at a first height is detected, a height of the sample is adjusted, and the X-Y surface is redetected; and through a detection layer by layer, the three-dimensional elasticity of the sample is detected.

6. The linear array scanning Brillouin scattering elastic imaging device according to claim 1, wherein the eight-channel optical collimator array consists of eight optical collimators connected in parallel, and is configured to receive Brillouin scattering signals generated at eight positions in the X-axis direction of the sample, and eight scattered signal beams are respectively transmitted to the eight-channel spectrometer.

\* \* \* \* \*